April 22, 1941.   E. B. NEWELL   2,238,981
SCREEN STRUCTURE
Filed Sept. 18, 1940   2 Sheets-Sheet 1

Inventor
Elwood Burton Newell
By Rice and Rice
Attorneys

Witness:
Richard F. Haskins

April 22, 1941.    E. B. NEWELL    2,238,981
SCREEN STRUCTURE
Filed Sept. 18, 1940    2 Sheets-Sheet 2
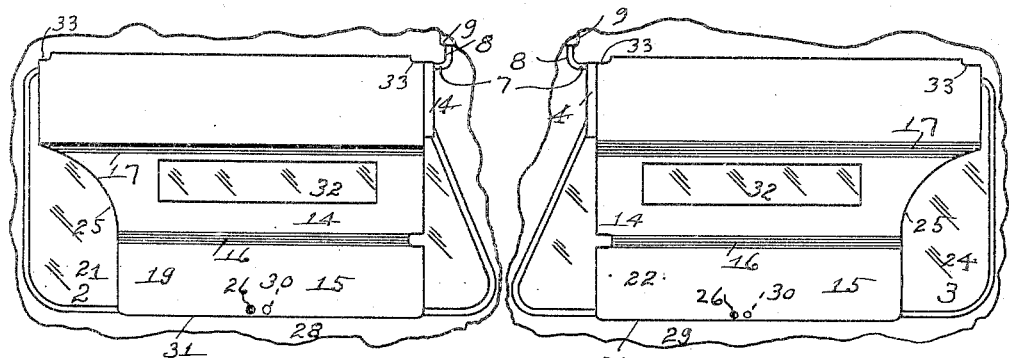
Fig. 4    Fig. 5
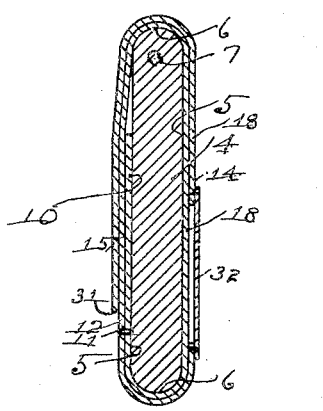 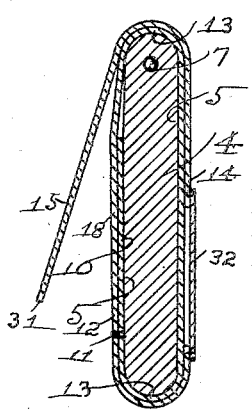 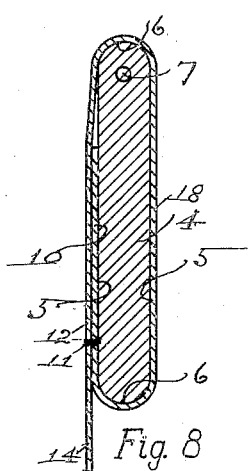
Fig. 6    Fig. 7    Fig. 8
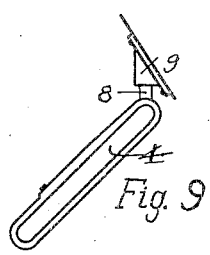 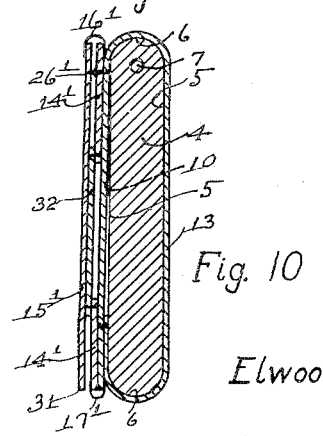
Fig. 9    Fig. 10
Witness:
Richard F. Haskins
Inventor
Elwood Burton Newell
By Rice and Rice
Attorneys Patented Apr. 22, 1941

2,238,981

UNITED STATES PATENT OFFICE 2,238,981

SCREEN STRUCTURE

Elwood Burton Newell, Grand Rapids, Mich.

Application September 18, 1940, Serial No. 357,272

8 Claims. (Cl. 296—97)

The present invention relates to window screens; and its object is, generally, to provide an improved screen for the front window having the windshield and for an adjacent side window of an automobile or the like; and more particularly, to provide such a screen which may be moved edgewise laterally, which may be turned upwardly-downwardly, and which may be extended downwardly—to screen desired portions of the window; and further, to provide such a screen which may be turned horizontally to screen the front (windshield) window or an adjacent side window of the automobile; and further, to provide such a screen in combination with mountings therefor whereby such movements may be made; and further, to provide an improved construction for such a screen.

These objects are attained by, and the invention finds preferable embodiment in, the illustrative screen structure particularly described in the body of this specification and illustrated by the accompanying drawings, in which:

Figure 4 is an interior view of a window at the left hand side of the automobile showing the screen's mounting turned parallel therewith and the screen in the position wherein the window is screened from top to bottom thereby;

Figure 5 is an interior view of the window at the right hand side of the automobile showing the screen's mounting turned parallel therewith and the screen in the position wherein the window is screened from top to bottom thereby;

Figure 6 is a transverse sectional view of the screen and its mounting taken on line 6—6 of Figure 1;

Figure 7 is a like transverse sectional view thereof but showing the flap or lower end of the screen in released position;

Figure 8 is a transverse sectional view of the same taken on line 8—8 of Figure 3;

Figure 9 is a right hand end view of the screen and its mounting turned inclinedly down from its position seen in Figure 2; and Figure 10 is a transverse sectional view of the screen and its mounting showing a modified construction thereof.

Figures 1, 2, 3:
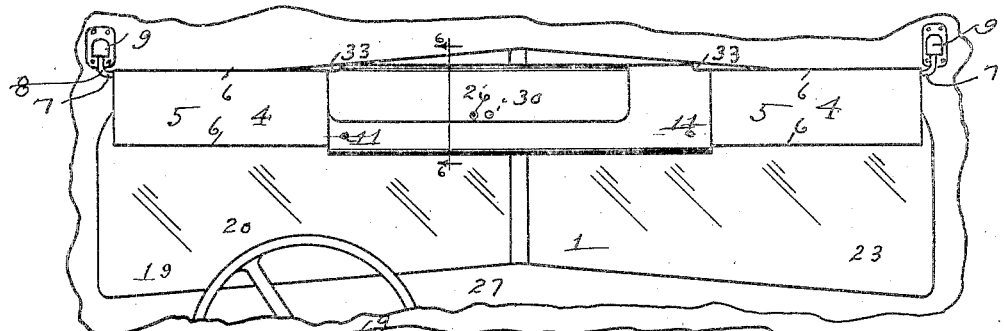
Figure 1 is an interior view of the front and windshield of an automobile showing my screen mounted in connection therewith in its position wherein the upper middle portion of the windshield is screened thereby.
Figure 2 is an interior view of the left hand side or pane of the windshield showing the screen shifted toward that side of the automobile and turned upwardly to non-screening position.
Figure 3 is an interior view of the windshield showing a pair of screens, one for each side or pane thereof, in their position wherein the panes are screened from top to bottom thereby.

My screen for the front window of an automobile (which has the windshield 1) and for an adjacent side window 2 or 3 of the automobile is shown by the drawings as having a mounting (or pair of mountings) comprising a horizontal bar 4, with approximately flat sides 5 and rounded edges 6, turnable on the spindle 7 of an L-shaped support 8 which is turnable horizontally on a bearing block 9 above the window.

The screen is slidable laterally along either bar 4, or along both bars when the same are turned to the aligned position indicated in Figure 1. A simple but effective slide bearing for the screen on the bar is best seen in the cross-sectional Figures 6, 7, 8, wherein the upper end portion or innermost ply 10 of the flexible sheet from which the screen is made is shown wrapped around the bar, being bent around its edges 6, and secured as by rivets 11 to the next portion or ply 12 of the sheet, thus forming a cross-sectionally elongated tubular portion 13 of the screen, loose enough on said bar to permit ready sliding along, but tight enough to prevent turning around, the bar.

The screen proper extends from said tubular portion 13 as a long flap folded or wrapped on and developable from the bar and said tubular portion 13, being thus wrapped in a counterclockwise direction in the form illustrated in Figures 1–8. This flap or screen proper comprises a plurality (two as shown) of horizontally extending sections 14, 15 hingedly connected as by an intermediate flexible portion 16 of the screen sheet, the upper section 14 being hingedly connected with the sheet's innermost ply 10 by a like flexible portion 17 of the sheet.

The screen is made of any suitable sheet material flexible enough to permit ready bending around the bar's edges 6, 6 but desirably stiff enough to approximately conform at 18 with the bar's sides 5. To effect this end, the hinge portions 16, 17 may be creased as indicated to render them more flexible than the sections or plies 14, 15 of the sheet.

In Figure 3 a pair of screens are shown, one 19 for the left hand side or pane 20 of the windshield and the left hand side window 21 of the automobile and the other 22 for the windshield's right hand side or pane 23 and the right hand side window 24 of the automobile. The inner lower corner of the screen as shown in Figure 3 may be cut away at 25 to afford unobstructed vision through the middle of the windshield.

Suitable means, as the button fastener device indicated at 26, serves to releasably hold the screen in its completely folded position or condition seen in Figures 1 and 6.

The screen has the following operations or uses: It may be slid along either bar 4, or along both bars when aligned as seen in Figure 1, to screen desired lateral portions of the windshield; as illustrated in Figure 1 the bar 4 may be turned on spindle 7 to vertical position to screen the upper part of the window, or to horizontal position seen in Figure 2 so that the window is not screened, or to an intermediate position as shown in Figure 9; the fastener 26 being released, the sections 14, 15 of the screen may be turned upwardly and drawn down behind the bar 4 to their extended positions shown in Figure 3 wherein the windshield is screened from top to bottom and in which position the lowermost section 15 may be releasably fastened on the front 27 of the automobile by said fastener; or the left hand bar 4 may be turned to the left hand side 28 of the automobile as shown in Figure 4 for screening the left hand window 21 of the automobile, or the right hand bar may be turned to the right hand side 29 of the automobile as shown in Figure 5 for screening the right hand window 24, the lowermost section 15 being, in either case, releasably fastened on the side 28 or 29 of the automobile by said fastener 26.

In order to position the cut away corner 25 of either screen toward the front instead of toward the rear of the automobile (as is shown in Figures 4 and 5) when either bar is turned toward the automobile's side, the screen is slid off of its bar and turned to direct the cut away corner forwardly and then slid onto the bar. In this position the lowermost section 15 may be fastened in place by a fastener indicated at 30 whose manually operated button is on the opposite side of the screen from that of the fastener 26. The lower edge 31 of the screen may be slid downwardly between the side window pane and the side of the automobile to hold the screen extended, and where the concave side of the hinge portions 16, 17 are next to the windshield, as in the left hand screen 19 in its drawn down position seen in Figure 3, the natural resilience of said portions presses said edge against the windshield.

Section 14 of the screen may have an opening therethrough covered by a transparent pane 32 as shown, which may be of colored glass.

The screen's opposite edges are desirably cut away at 33 to permit the ready folding over of the screen past the L-shaped supports 8.

In the modified construction illustrated in Figure 10, the sections 14' and 15' are connected by a freely flexible hinge 16' and the section 14' is connected with the ply 10 by a like hinge 17'. These sections may be folded into side to side parallel relation shown in this view, button fastener indicated at 26' being released these sections will freely fall to vertical screening position.

The invention being intended to be pointed out in the claims, is not to be limited to or by details of construction of the particular embodiment thereof illustrated by the drawings or hereinbefore described.

I claim:

1. A screen structure of the class described comprising: a mounting including a horizontal bar; a sheet screen slidable edgewise on the bar, wrapped therearound and adapted to be unwrapped into screening position.

2. A screen structure for the windshield and opposite side windows of an automobile comprising: a mounting including a pair of horizontal bars turnable to the windshield into aligned position and each turnable to the side window adjacent thereto; a sheet screen slidable edgewise on either bar and on both bars in their aligned position, wrapped therearound and developable into screening position.

3. A screen structure of the class described comprising: a mounting including a cross-sectionally elongated bar turnable to cross-sectionally horizontal and vertical positions; a sheet screen wrapped around the bar and adapted to be unwrapped into screening position.

4. A screen structure of the class described comprising: a mounting including a cross-sectionally elongated horizontal bar having approximately flat opposite sides; a sheet screen wrapped around the bar comprising horizontally extending hingedly connected sections in parallel wrapped relation with said sides, the screen being developable into screening position.

5. A screen structure of the class described comprising: a mounting including a cross-sectionally elongated horizontal bar having approximately flat opposite sides; a sheet screen wrapped around the bar comprising horizontally extending comparatively rigid sections in parallel wrapped relation with said sides and integral comparatively flexible portions hingedly connecting the sections, the screen being developable into screening position.

6. A screen structure of the class described comprising: a mounting including a cross-sectionally elongated horizontal bar with approximately flat opposite sides; a sheet screen having a tubular upper portion non-turnably slidable along the bar and a flap portion wrapped therearound, developable into screening position.

7. A screen structure of the class described comprising: a mounting including a cross-sectionally elongated bar; a sheet screen wrapped therearound and developable into screening position; and means for releasably securing the screen in its wrapped and in its developed positions alternately.

8. A screen structure of the class described comprising: a mounting including a horizontal bar; a sheet screen slidable edgewise on the bar, folded in parallel relation with the sides thereof and adapted to be unfolded into screening position.

ELWOOD BURTON NEWELL.